United States Patent [19]

Wiltrout

[11] 4,133,452

[45] Jan. 9, 1979

[54] SALMON EGG DISPENSER

[76] Inventor: James W. Wiltrout, R.D. #1, Markleton, Pa. 15551

[21] Appl. No.: 799,646

[22] Filed: May 23, 1977

[51] Int. Cl.$^2$ .................. A01K 97/04; B65G 59/00
[52] U.S. Cl. ............................ 221/185; 224/5 G; 43/55; 124/27; 221/271
[58] Field of Search ............... 221/185, 263, 264, 268, 221/270, 271, 272, 276, 281, 279, 232; 43/55; 222/361, 365, 366, 559, 243, 175; 124/21, 26, 27, 41 R, 49, 50; 224/5 R, 5 H, 5 G

[56] References Cited

U.S. PATENT DOCUMENTS

| 1,319,296 | 10/1919 | Liggon | 124/49 |
|---|---|---|---|
| 1,347,433 | 7/1920 | Allen | 124/27 |
| 2,434,436 | 1/1948 | Rochowiak | 124/27 |
| 2,443,861 | 6/1948 | Johnston | 221/185 |
| 2,518,986 | 8/1950 | Griffith | 43/55 |
| 2,590,177 | 3/1952 | Hopwood | 222/559 |
| 2,718,089 | 9/1955 | Heaton | 43/55 |
| 2,759,390 | 8/1956 | Edwards | 221/276 |
| 2,787,080 | 4/1957 | Wells | 43/55 |
| 4,023,712 | 5/1977 | Babiak et al. | 222/175 |

*Primary Examiner*—Stanley H. Tollberg
*Assistant Examiner*—H. Grant Skaggs
*Attorney, Agent, or Firm*—Clarence A. O'Brien; Harvey B. Jacobson

[57] ABSTRACT

An upstanding tubular body is provided defining a longitudinal passage extending therethrough. A closure is removable supported from the upper end of the body and encloses the upper end of the passage. A generally horizontal tubular head is carried by the lower end of the body and defines a longitudinal bore extending therethrough with one end of the bore including a diametrically enlarged counterbore. The passage is of a diameter to receive vertically stacked salmon eggs therein and the bore is of generally the same diameter. A plunger is reciprocal in the bore and extends across the lower end of the passage. The plunger includes a diametrically enlarged abutment seated in the inner end of the counterbore and the outer end of the counterbore includes an inwardly projecting abutment. A compression spring is disposed about the plunger intermediate the inwardly projecting abutment and the outwardly projecting plunger mounted abutment and the plunger extends outwardly of the outer end of the counterbore and has a diametrically enlarged head thereon. The head may be grasped in order to retract the plunger whereby the end thereof remote from the head is retracted past the lower end of the passage to thereby enable a salmon egg in the lower end of the passage to drop into the bore. Of course, the salmon egg may be ejected from the bore upon release of the plunger and its movement under the biasing action of the spring to a position with the outwardly projecting abutment seated in the inner end of the counterbore.

4 Claims, 3 Drawing Figures

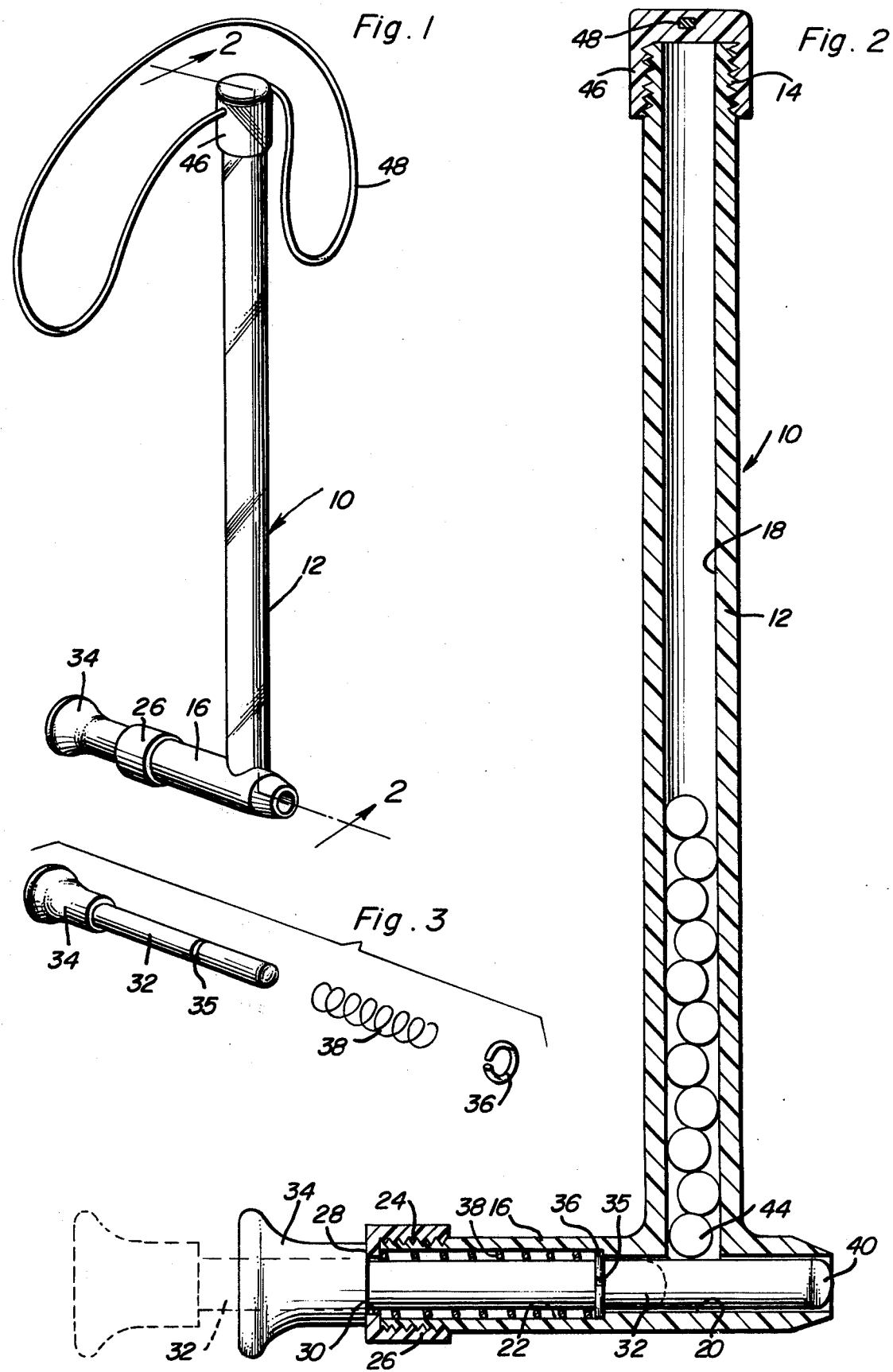

SALMON EGG DISPENSER

BACKGROUND OF THE INVENTION

Various forms of bait dispensers have been heretofore provided and some of these previously known bait dispensers have been specifically designed to dispense salmon eggs. However, these various salmon egg dispensers are in some instances constructed in a manner whereby the supply of salmon eggs disposed therein may become jammed as a result of an attempt being made to dispense a single salmon egg therefrom. Further, other forms of known salmon egg dispensers are constructed in a manner such that there dispensing mechanisms are difficult to operate and still other salmon egg dispensers are constructed in a manner such that they must be belt mounted or mounted on an associated fishing rod. These aspects of known salmon egg dispensers constitute undesirable features, at least in some instances, and there is, accordingly, a need for a salmon egg dispenser which will be capable of storing a plurality of salmon eggs, singly dispensing salmon eggs therefrom without jamming, being readily supported from the neck of the user thereof, being readily adaptable for use by both right- and left-handed persons and being readily actuated to dispense a single salmon egg therefrom with little effort.

Examples of previously known forms of bait dispensers including some of the general structural and operational features of the instant invention are disclosed in U.S. Pat. Nos. 914,320, 2,443,861, 2,518,986, 2,763,956, 2,787,080 and 2,816,393.

BRIEF DESCRIPTION OF THE INVENTION

The bait dispenser of the instant invention comprises an upstanding tubular body including an integral horizontal tubular head on its lower end. The tubular body defines a longitudinal passage extending therethrough which opens centrally into the bore defined through the tubular head carried by the lower end of the body. A plunger is reciprocal in the bore and may be shifted between positions with the plunger extending across the lower end of the passage and a dispensing position with the plunger retracted from registry with the lower end of the passage whereby a salmon egg disposed in the lower end of the passage may drop into the bore of the crosshead in which the plunger is reciprocal. Spring structure is provided for yieldingly biasing the plunger to a position extending across the lower end of the passage and is therefore operative to shift the plunger from a position retracted out of registry with the lower end of the body passage to a position extending across the lower end of the passage.

The main object of this invention is to provide a salmon egg dispenser which may be readily worn by fisherman on the exterior of whatever clothing the fisherman may be wearing and which may be readily actuated to singly dispense salmon eggs therefrom without jamming.

Another object of this invention is to provide a salmon egg dispenser which is readily adaptable for use by both right- and left-handed fishermen.

Another important object of this invention is to provide a salmon egg dispenser which will be capable of storing a plurality of salmon eggs therein preparatory to singly dispensing the salmon eggs from the dispenser.

A final object of this invention to be specifically enumerated herein is to provide a salmon egg dispenser in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the salmon egg dispenser of the instant invention;

FIG. 2 is an enlarged vertical sectional view taken substantially upon the plane indicated by the section line 2—2 of FIG. 1 and with an alternate position of the dispensing plunger illustrated in phantom lines; and FIG. 3 is an exploded prospective view of the plunger assembly of the dispenser.

DESCRIPTION OF THE PREFERRED EMBODIMENT

Referring now more specifically to the drawings, the numeral 10 generally designates the salmon egg dispenser of the instant invention.

The dispenser 10 includes an upstanding tubular body 12 which is externally threaded on its upper end portion as at 14. The lower end portion of the body 12 is formed integrally with a horizontal tubular crosshead 16.

The body 12 defines a central passage 18 extending therethrough and the crosshead 16 defines a central bore 20 extending therethrough. The cross-head 16 extends outwardly beyond opposite sides of the body 12 and one end of the bore 20 includes a diametrically enlarged centerbore 22.

The end of the crosshead 16 outwardly through which the outer end of the counterbore 22 opens is externally threaded as at 24 and an end cap 26 is threadedly telescoped over the externally threaded end of the crosshead 16. The end cap 26 includes an end wall 28 having a central aperture 30 formed therethrough and the aperture 30 is substantially coaxial with the bore 20 and the counterbore 22, but is of a smaller diameter than the counterbore 22.

A plunger 32 is snugly and slidingly received in the bore 20 and through the aperture 30. The end of the plunger 32 projecting outwardly through the aperture 30 includes a diametrically enlarged head 34 thereon and the plunger 32 includes a circumferential groove 35 in which a split snap ring 36 is seated The snap ring 36 defines an outwardly projecting abutment carried by the plunger 32 and the snap ring or abutment 36 is seated in the inner end of the counterbore with a coiled compression spring 38 disposed about that portion of the plunger 32 disposed in the counterbore 22 with one end of the spring 38 abutted against the abutment 36 and the other end of the spring 38 abutted against the inner surface of the end wall 28 outwardly of the aperture 30.

The end of the plunger 32 remote from the head 34 is convexly rounded as at 40 and is retractable to a position disposed on the side of the passage 18 adjacent the inner end of the counterbore 22 upon outward retraction of the plunger 32 against the biasing action of the spring 38 to the phantom line position of the plunger 32 illustrated in FIG. 2. When the plunger 32 is retracted to the phantom line position thereof illustrated in FIG.

2, the lowermost salmon egg 44 in the lower end of the passage 18 is free to drop into the bore 20. Thereafter, the plunger 32 may be released in order that the spring 38 may return the plunger 32 to the solid line position thereof illustrated in FIG. 2 in order to eject the salmon egg 44 from the bore 20.

It will, of course, be understood that when the plunger 32 is released for movement back toward the solid line position thereof illustrated in FIG. 2, one hand of the user will be disposed over the end of the bore 20 remote from the counterbore 22 in order to receive the single salmon egg 44 dispensed from the dispenser 10.

The upper end of the body 12 is closed by means of a closure cap 46 removably threadedly engaged over the upper end of the body 12 and the closure cap 46 includes a closed flexible loop 48 of a size to be slipped over the head of an adult user whereby the dispenser 10 may be suspended from the neck of the user.

It will be noted that the body and crosshead are one piece construction and preferably constructed of plastic. Of course, the caps 26 and 46 may also be constructed of plastic as may be the plunger 32.

The dispenser 10 may be readily utilized by both right- and left-handed fisherman merely by the user of the dispenser 10 suspending the latter from about his neck by means of the loop 48 with the longer end of the crosshead 16 projecting to the correct side.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bait dispenser including an upstanding tubular body defining a longitudinal passage extending therethrough, a closure removably supported from said body and closing the upper end of said passage, a generally horizontal tubular head carried by the lower end of said body and defining a longitudinal bore extending therethrough, the lower end of said passage opening centrally into said bore intermediate its opposite ends, said passage being of a diameter adapted to receive a plurality of stacked salmon eggs therein, an elongated plunger snugly reciprocal in said bore, one end of said bore including a counterbore spaced from said passage, said plunger including laterally outwardly projecting first abutment means seated in said counterbore and said plunger including a first rounded end disposed on the side of said passage remote from said counterbore and retractable past said passage toward said counterbore, adjacent the outer end of said counterbore an inwardly projecting second abutment means, and a coiled compression spring disposed about said plunger in said counterbore with one end thereof seated against said outwardly projecting first abutment means and the other end thereof seated against said inwardly projecting second abutment means and thereby yieldingly biasing said plunger to a static position extending across and thus blocking the lower end of said passage, the second end of said plunger includng an enlarged head thereon outwardly of said counter bore, said plunger being shiftable in said bore and counterbore sufficiently away from said static position and against the biasing action of said spring to retract said first end of said plunger across the lower end of said passage, said plunger including a circumferential groove, said first abutment means comprising a split abutment ring seated in said groove and snugly slidably received in said counterbore, said second abutment means comprising a centrally apertured end wall on a closure cap secured over head closing the outer end of said counterbore, said plunger being snugly slidingly received through the central aperture in said end wall.

2. The combination of claim 1 wherein said closure comprises a closure cap removably telescopingly secured over the upper end of said tubular body.

3. The combination of claim 2 wherein said closure cap has a flexible loop member anchored thereto of a size to be slipped over the head of an adult user of said dispenser for support of the dispenser from the neck of the user.

4. The combination of claim 1 wherein said tubular body and tubular head are of one piece construction and constructed of plastic.

* * * * *